(12) United States Patent
Kitaura (10) Patent No.: US 6,375,378 B1
(45) Date of Patent: Apr. 23, 2002

(54) TOOL CONNECTING DEVICE FOR ROBOT HAND

(75) Inventor: Ichiro Kitaura, Itami (JP)

(73) Assignee: Pascal Kabushiki Kaisha (JP)

( * ) Notice: Subject to any disclaimer, the term of this patent is extended or adjusted under 35 U.S.C. 154(b) by 0 days.

(21) Appl. No.: 09/582,852

(22) Filed: Jul. 5, 2000

(30) Foreign Application Priority Data

Nov. 5, 1998 (JP) .............................. 10-315089

(51) Int. Cl.$^7$ .............................. F16C 31/00; B25J 17/00

(52) U.S. Cl. ..................... 403/31; 403/322.2; 901/41

(58) Field of Search .............................. 403/321, 322.1, 403/322.2, 322.3, 328, 31, 24; 901/30, 41, 27–29; 414/729–730; 279/75, 905, 4.06, 4.12; 439/348, 197

(56) References Cited

U.S. PATENT DOCUMENTS

| | | | | | |
|---|---|---|---|---|---|
| 4,636,135 | A | * | 1/1987 | Bancon | 414/730 |
| 4,696,524 | A | * | 9/1987 | Cloyd | 439/197 |
| 4,793,053 | A | * | 12/1988 | Zuccaro et al. | 279/4.01 |
| 5,002,500 | A | * | 3/1991 | Zuccaro et al. | 439/348 |
| 5,294,209 | A | * | 3/1994 | Naka et al. | 403/24 |
| 6,170,836 | B1 | * | 1/2001 | Etter | 279/4.06 |

FOREIGN PATENT DOCUMENTS

| | | | |
|---|---|---|---|
| JP | 5-70881 | * | 9/1993 |
| JP | 6-42091 | * | 6/1994 |

* cited by examiner

*Primary Examiner*—Harry C. Kim
(74) *Attorney, Agent, or Firm*—Morrison Law Firm (57) ABSTRACT

Roller member connectors facilitate quick change of tools used by robot hands. Each roller member includes a pair of projections on either side thereof. On the inner surface of each retainer opening, a pair of guide grooves are formed to guide the projections so that they are retained during operation.

12 Claims, 7 Drawing Sheets

TOOL CONNECTING DEVICE FOR ROBOT HAND

BACKGROUND OF THE INVENTION

The present invention relates to a tool connecting device for robot hands. More specifically, the present invention relates to a tool connecting device for robot hands that allows tools to be switched quickly and reliably without dropping of parts and the like.

An example of a generally known tool connecting device for robot hands that allows one out of a plurality of tools to be selectively attached to and detached from a hand section of a robot hand includes: an inner assembly (master plate) attached to the hand section of the robot hand; an outer assembly (tool plate) to which tools are attached; and a locking mechanism that locks together the inner assembly and the outer assembly.

U.S. Patent No. 4,696,524 describes a tool coupling device that allows quick connecting and disconnecting of the inner assembly and the outer assembly for tool connecting devices for robot hands described above. The lock mechanism for this tool coupling device for robot hands includes: a piston member; ball members serving as a plurality of engagement members; and a ball receiver serving as an engagement section.

The piston member described above is supported by the inner assembly and can slide between a locked position and an unlocked position. The ball members are held in retainer openings of a roughly cylindrical ball retainer connected to the inner assembly and extending along the outer perimeter of the output section of the piston member. The ball members are supported so that they can move in a direction perpendicular to the direction in which the piston member slides (hereinafter referred to simply as the perpendicular direction). Thus, in the retainer openings of the ball retainer, the radially inward side and the radially outward side are connected in the perpendicular direction, and the ball members can move in the perpendicular direction within the retainer opening.

The ball receiver is disposed on the outer assembly and is formed with a tapered surface that can come into contact with the ball members. When the piston member moves to the locked position, the ball receiver cooperates with the ball members to connect and support the inner assembly and the outer assembly.

A plurality of plate springs are disposed on the ball retainer along the outer perimeter surface of the ball retainer but not at the retainer openings. The ends of the adjacent plate springs serve to prevent ball members from dropping down and push the ball members toward the radially inward side of the ball retainer, especially when the connection between the inner assembly and the outer assembly is released.

Japanese laid-open patent publication number 4-63688 presents a tool connecting device for robot hands that also prevents ball members from dropping by using a plurality of plate springs disposed along the outer perimeter surface of a ball retainer. These plate springs prevent the ball members from dropping out from the ball retainer.

With these type of tool connecting device for robot hands, a plurality of plate springs must be disposed in order to push the ball members radially inward in the ball retainer and prevent them from dropping out. This requires a complex structure and a large number of parts, thus increasing production costs. Furthermore, since ball members are used as engagement members, a point contact is formed between the spherical surface of the ball member and the flat surface of the ball receiver. Because of the resulting small contact area, the contact surface pressure on the ball member becomes high. Thus, the durability of the lock mechanism is short.

OBJECTS AND SUMMARY OF THE INVENTION

The object of the present invention is to provide a robot hand tool connecting device attaining a long durability, low production costs, simplified structure, and a small number of parts and that also reliably prevents the engagement members from dropping out.

The present invention provides a tool connecting device for robot hands including: a master plate connected to a hand section of a robot hand; a tool plate connected to a tool; and locking means removably locking the master plate and the tool plate. Locking means includes: a piston member supported by the master plate and capable of sliding between a locked position and an unlocked position; a retainer fixed to the master plate and extending along the outer perimeter of an output section of the piston member; a plurality of roller members supported in a plurality of retainer openings of the retainer and capable of moving in a direction perpendicular to the direction in which the piston member slides; engagement sections disposed on the tool plate and engaging with the plurality of roller members. Each of said plurality of roller members is formed from a roller member, and projections are disposed at the center of the side surfaces of each roller member perpendicular to the axis thereof. Guide grooves are formed at the sides of the retainer openings of the retainer to guide the pairs of projections on the roller members and to prevent them from falling out.

In this tool connecting device for robot hands, when the master plate and the tool plate are to be connected, the piston member is made to slide to the locked position, and the roller members in the retainer openings are moved outward in a direction perpendicular to the direction in which the piston member slides. The roller members are fitted between the engagement section and the output section of the piston member, thus locking the master plate and the tool plate. The roller members are guided so that the pairs of projections thereof do not fall out from the guide grooves formed at the sides of the retainer openings.

When the master plate and the tool plate are to be unlocked, the piston member is made to slide to the unlocked position. The roller members in the retainer openings are then able to move inward in the direction perpendicular to the direction in which the piston member slides, thus unlocking the plates. Since the roller members are guided so that the pairs of projections thereof do not fall out from the guide grooves, the roller members can be reliably prevented from falling out, while the need for a plurality of plate springs that prevent the engagement members from falling out is eliminated. Thus, the number of parts can be reduced and the structure can be simplified. Since the engagement members are formed as roller members, line contacts are formed at least between the roughly cylindrical surfaces of these roller members and the engagement sections. Thus, compared to the conventional ball members, the contact area is larger and the contact surface pressure can be reduced. This improves the durability of the locking means and allows the durability of the tool connecting device for robot hands to be improved.

Preferably, the pair of projections of each roller member is formed integrally with the roller main body. This provides a simplified structure and reduces the number of parts, thus lowering production costs. Also, preferably, the pair of projections of each roller member is formed as the ends of a pin member mounted in an axial opening of the roller main body. This makes producing of the roller main body easier, and the mounting of the pin member in the roller main body can be performed easily.

In the tool connecting device for robot hands described above, it would be desirable to have an air cylinder including the piston member disposed on the master plate. The air cylinder drives the piston member between the locked position and the unlocked position. By driving the piston member between the locked position and the unlocked position, the air cylinder is able to lock and unlock the master plate and the tool plate reliably and simply.

Furthermore, it would be desirable to have a structure in which, when the piston member is at the locked position, the plurality of roller members is supported at a projected position projecting from the outer surface of the retainer and engaging with the engagement section, and, when the piston member is at the unlocked position, the plurality of roller members is able to move between the projected position and a recessed position inward from the outer surface of the retainer. With this structure, the master plate and the tool plate can be connected and disconnected reliably according to the positions of the piston member.

It would be desirable to have a tapered section formed on the engagement section that is tapered radially inward toward the master plate. When the piston member is in the locked position, the roller members in the projected position can engage with the tapered section of the engagement section, thus allowing the master plate and the tool plate to be reliably locked.

It would also be desirable to have a contact section disposed on the tool plate that is able to form a surface contact with a section of the outer perimeter surface of the roller member. When the roller member is in contact with the engagement section, a surface contact is formed with the contact section. This increases the contact area for the roller member and further reduces the contact surface pressure, thus significantly improving the life span of the locking means.

It would be desirable to have the plurality of roller members supported in a plurality of retainer openings formed at appropriate intervals along the perimeter of the retainer. By having the plurality of rollers engaged with the engagement sections, the master plate and the tool plate can be reliably locked.

It would also be desirable to have a plurality of engagement sections formed on the tool plate at positions corresponding to the plurality of roller members. This allows the plurality of engagement sections to be formed easily by cutting away tool plate members, thus allowing production costs to be reduced.

It would also be desirable to have the guide grooves formed as U-shaped grooves opening inward. This reliably prevents the roller members from dropping out from the retainer and allows the roller member to be reliably assembled into the retainer openings of the tool plate from the inside.

It would be desirable for a restricting section to be disposed on the piston member to restrict the roller members from moving inward from the recessed position when the piston member is in the unlocked position. When the piston member is in the unlocked position, the restricting section prevents the roller members from moving inward from the recessed position, and this reliably prevents the roller members from falling toward the inside of the retainer.

It would be desirable for the air cylinder to be a double-action air cylinder. This allows the piston member to be reliably moved between the unlocked position and the locked position. It would also be desirable for the piston member to be a single-action air cylinder. This allows the piston member to be reliably moved at least from either the unlocked position to the locked position or vice versa. In this case, it would be desirable to have the piston member kept in the locked position when the air cylinder is inactive using a spring member or the like. When the air cylinder is activated, the piston member can then be moved to the unlocked position.

Briefly stated, the present invention provides roller member connectors that facilitate quick change of tools used by robot hands. Each roller member includes a pair of projections on either side thereof. On the inner surface of each retainer opening, a pair of guide grooves are formed to guide the projections so that they are retained during operation.

According to an embodiment of the invention, there is provided a tool connecting device for robot hands comprising: a master plate connectable to a hand section of a robot hand; a tool plate connectable to a tool; a piston member movably supported by the master plate and slidable between a locked position and an unlocked position; a retainer fixed to the master plate; the retainer extending along an outer perimeter of an output section of the piston member; the retainer having a plurality of roller members; a plurality of retainer openings in said retainer; the roller members being supported in the plurality of retainer openings of the retainer and movable in a direction perpendicular to a direction in which the piston member slides; a plurality of engagement sections disposed on the tool plate; and the plurality of engagement sections engaging with the plurality of roller members.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Referring to the drawings, the following is a description of an embodiment of the invention.

Referring to FIG. 1 through FIG. 5, a tool connecting device 1 for robot hands includes a master plate unit including a master plate 2 connected to the hand section of a robot hand, a tool plate unit including a tool plate 3 to which tools are connected with a tool, and a lock mechanism 4 capable of locking and unlocking the master plate 2 and the tool plate 3. The lock mechanism 4 includes a piston member 5, a retainer 6, roller members 7 serving as a plurality of engagement members, and a roller receiver 8.

Figure 1:
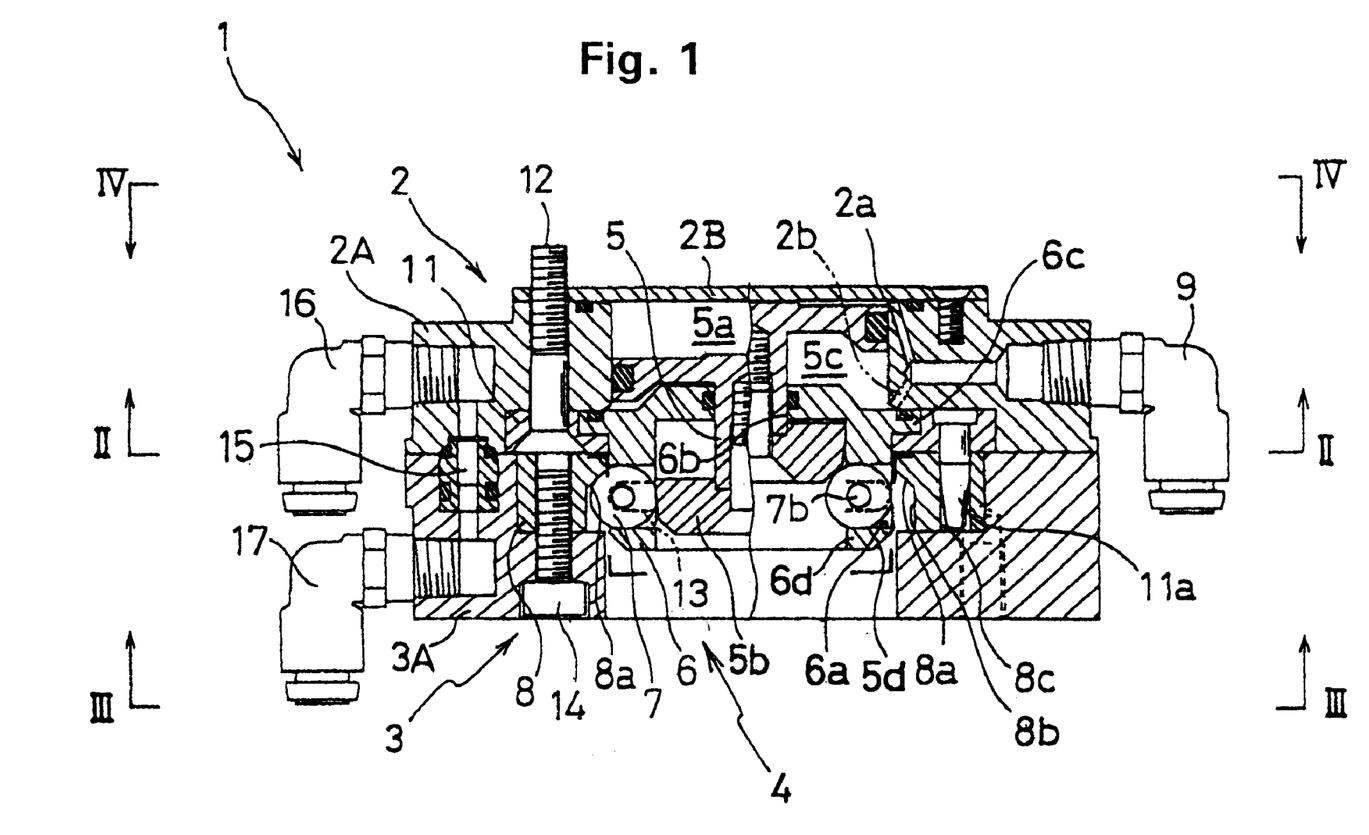
FIG. 1 is a vertical cross-section drawing of a tool connecting device for robot hands according to an embodiment of the present invention.
Figure 3:
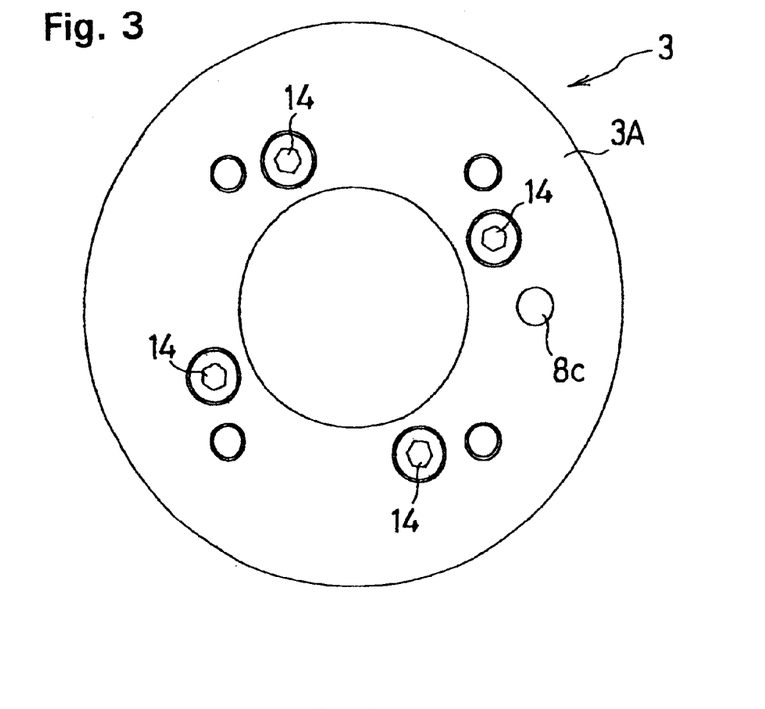
FIG. 3 is another view of the structure in FIG. 1 as seen from the III—III line.
Figure 4:
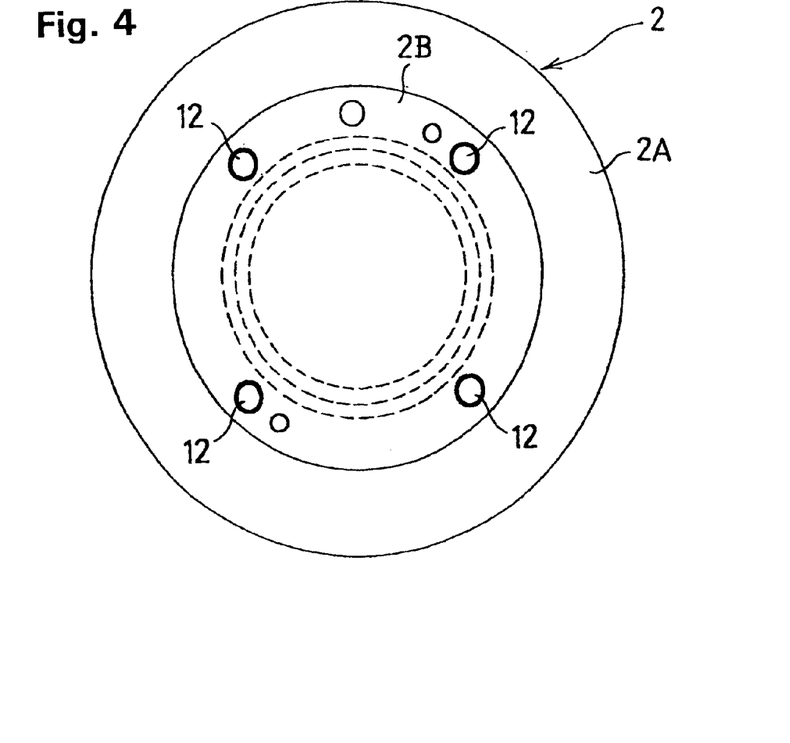
FIG. 4 is another view of the structure in FIG. 1 as seen from the IV—IV line.
Figure 5:
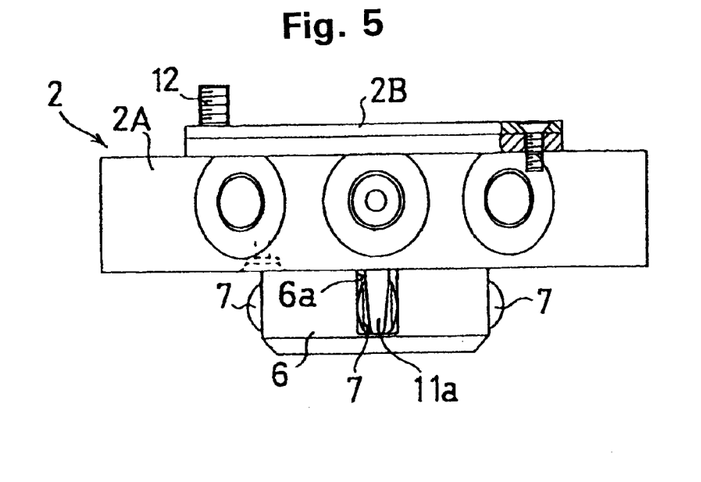
FIG. 5 is a side-view drawing of a master plate unit in the disconnected state.

Referring to FIG. 1, FIG. 4, and FIG. 5, the master plate 2 includes a roughly cylindrical master plate main body 2A, a cover 2B fixed to the upper end of the master plate main body 2A via a ring-shaped sealing member, and a ring member 11 fixing the upper end of the wall of the retainer 6 fixed to the bottom end of the master plate main body 2A and the retainer 6 to the master plate main body 2A. A double-action air cylinder is disposed vertically on the master plate 2, and a cylinder opening is formed on the master plate 2. A piston section of the piston member 5 of the air cylinder is slidably mounted in an air-tight manner in the cylinder opening of the master plate main body 2A. Referring to FIG. 1 and FIG. 3, the tool plate 3 includes a roughly cylindrical tool plate main body 3A.

Figure 2:
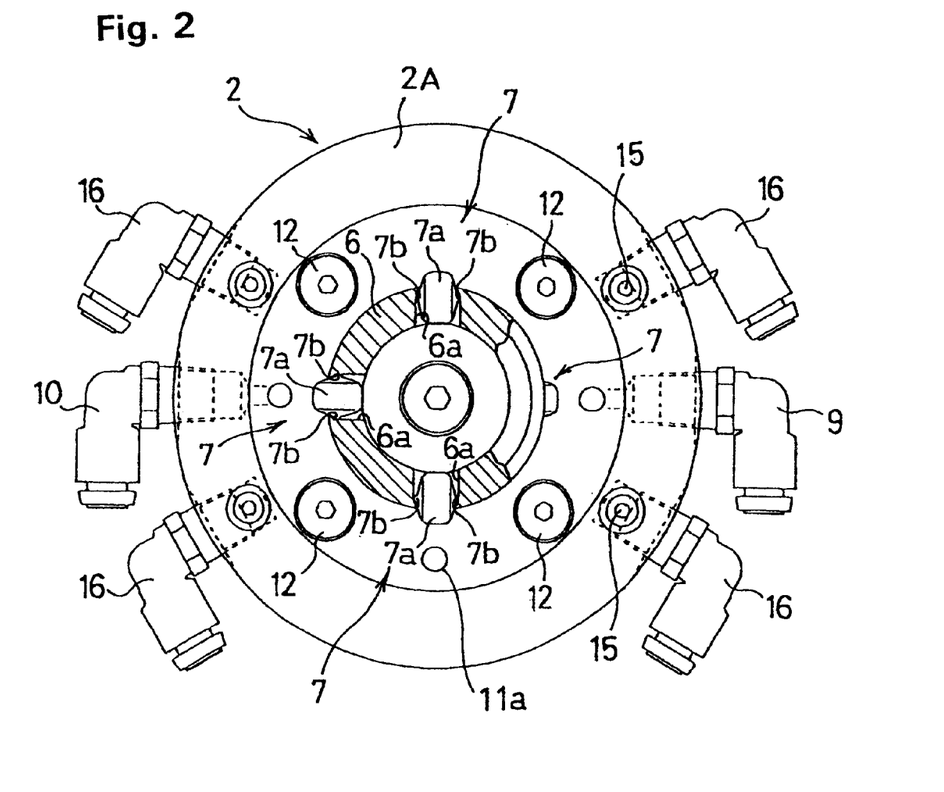
FIG. 2 is a cross-section drawing along the II—II line in FIG. 1.

Referring to FIG. 1 and FIG. 2, a rod of the piston member 5 is inserted along with a ring-shaped sealing member into a guide opening 6b formed at the center of the upper side wall of the retainer 6. The rod of the piston member 5 is able to slide inside the guide opening 6b in an air-tight manner. At the lower end of the rod of the piston member 5, an output section 5b is fixed with screws, and a tapered restricting section 5d is formed around the outer perimeter of the lower end of the output section 5b. The piston member can be raised and lowered between a locked position and an unlocked position. Referring to the left half of FIG. 1, there is shown the piston member 5 in the lowered, locked position. Referring to the right half of FIG. 1, there is shown the piston member 5 in the raised, unlocked position.

In the cylinder opening of the master plate 2 are formed a first cylinder chamber 5a interposed between the piston member 5 and the cover 2B, and a second cylinder chamber 5c interposed between the piston member 5 and the retainer 6. A connecting piece 9 is disposed on the master plate main body 2A to supply compressed air to the first cylinder chamber 5a via a path 2a. A connecting piece 10 is also disposed on the master plate main body 2A to supply compressed air to the second cylinder chamber 5c via a path 2b. Air hoses from an air source are connected the connecting pieces 9, 10. As compressed air is sent from the connecting piece 9 into the first cylinder chamber 5a via the opening 2a, the piston member 5 is lowered to the locked position. As compressed air is sent from the connecting piece 10 into the second cylinder chamber 5c via the path 2b, the piston member 5 is raised to the unlocked position.

The retainer 6 includes a ring-shaped retainer main body 6d extending along the outer perimeter of the output section 5b of the piston member 5. Four retainer openings 6a are formed at uniform intervals along a circle on the retainer main body 6d. At the outer perimeter of the upper end of the retainer 6 is formed an engagement section 6c. This engagement section 6c is fixed toward the lower end of the master plate main body 2A. A plurality of bolts 12 is used to fix the ring member 11 to the master plate main body 2A, and these bolts 12 connect the master plate main body 2A to the hand section of the robot. A downwardly projecting tapered pin 11a is disposed on the ring member 11. The lower end of the ring member 11 and the head of the bolt 12 are roughly coplanar with the lower end of the master plate main body 2A. This prevents obstruction with the tool plate main body 3A when connecting with the tool plate main body 3A and the master plate main body 2A.

Referring to FIG. 1 and FIG. 2, four roller members 7 (which serve as engagement members) are movably supported in the four retainer openings 6a of the retainer 6. The four roller members 7 can move in a direction perpendicular (radial) to the direction in which the piston member 5 slides (vertical). This will hereinafter referred to as the perpendicular direction. The side surfaces perpendicular to the axis of the roller member form gentle cone shapes. At the center section of the side surfaces is a projection 7b formed integrally with the roller main body 7a. The cylindrical perimeter surface and the side surfaces of each roller member 7 form a continuous curved surface. Guide grooves 13 are formed at the sides of the retainer openings 6a of the retainer 6. These guide grooves 13 guide the pairs of projections 7b in the perpendicular direction so that they don't fall out. Each guide groove 13 is formed as a U-shaped groove extending sideways. The radially outward end of the groove is closed to prevent the roller member 7 from falling out, and the radially inward end is opened inward to allow the roller member 7 to be mounted.

Referring to FIG. 1, the roller receiver 8 is formed in a ring shape on a shelf along the inner perimeter toward the upper end of the tool plate main body 3A. The roller receiver 8 is fixed to the tool plate main body 3A using a plurality of bolts 14. The inner perimeter surface of the roller receiver 8, which serves as an engagement section engaging with the four roller members 7, includes a tapered surface 8a sloping inward and upward and a cylindrical surface 8b extending downward from the bottom end of the tapered surface 8a.

The cylindrical surface 8b is formed with a diameter that is somewhat larger than the inner diameter of the tool plate main body 3A. The upper half of the tapered surface 8a is formed with a diameter that is somewhat smaller than the inner diameter of the tool plate main body 3A. The roller receiver 8 can come into contact with the roller member 7 via the tapered surface 8a. When the piston member 5 moves to the locked position, the output section 5b moves the plurality of roller members 7 outward and supports the roller members 7 at a projected position where they project out from the outer surface of the retainer 6 and engage with the tapered surface 8a. Thus, the output section 5b cooperates with the roller member 7 to connect and support the master plate 2 and the tool plate 3. When the piston member 5 moves to the unlocked position, the plurality of roller members 7 is able to move between the projected position and a recessed position inward from the outer surface of the retainer 6, thus allowing the master plate 2 and the tool plate 3 to be freely connected and disconnected.

A plurality of pin openings 8c that can fit a plurality of tapered pins 11a is formed on the roller receiver 8. If, for example, four systems (e.g., hydraulic or pneumatic systems) are to be used to send pressurized fluid from the robot side to the tools side, four connection pieces 16 can be disposed around the outer surface of the master plate main body 2A and four connection pieces 17 corresponding to the four connecting pieces 16 can be disposed around the outer surface of the tool plate main body 3A. When the master plate 2 and the tool plate 3 are connected, a communicating channel 15 connects the upper and lower fluid paths.

The following is a description of the operations of the tool connecting device 1 for robot hands.

The master plate 2 is connected beforehand to the hand section of the robot hand, and prescribed tools are connected beforehand to the tool plate 3 (not shown in the figures). To connect the master plate 2 and the tool plate 3, the robot hand brings the master plate unit and the tool plate unit close together and aligns the two units. The piston member 5 is moved to the unlocked position, and the plurality of tapered pins 11a on the master plate 2 is fitted to the plurality of pin openings 8c on the tool plate 3, thus aligning the master plate 2 and the tool plate 3 and providing a temporary coupling.

Next, the output section 5b of the piston member 5 is lowered to the locked position. The four roller members 7 are pushed radially outward within the retainer opening 6a of the retainer 6 by the output section 5b and are displaced outward in the perpendicular direction to be positioned at the projected position, where it comes into contact with the tapered surface 8a of the roller receiver 8. Thus, the roller members 7 are engaged with the tapered surface 8a, the output section 5b, and the retainer opening 6a, locking the master plate 2 and the tool plate 3 firmly together. The pairs of projections 7b of the roller members 7 are displaced radially outward within the guide grooves 13 at the sides of the retainer openings 6a.

When the master plate 2 and the tool plate 3 are to be disconnected, compressed air is sent into the second cylinder chamber 5c from the connecting piece 10 through the path 2b. The piston member 5 moves upward to the unlocked position, allowing the four roller members 7 to move between the projected position and a recessed position within the retainer opening 6a. As a result, the master plate 2 is unlocked from the tool plate 3. When the piston member 5 is in the unlocked position, the restriction section 5d of the piston member 5 restricts the plurality of roller members 7 so that they cannot move inward from the recessed position. Then, when the robot hand is raised and the master plate unit is moved away from the tool plate unit, the plurality of roller members moves inward within the retainer opening 6a of the retainer 6. When the tapered pins 11a are pulled out from the pin openings 8c, the master plate 2 and the tool plate 3 are completely disconnected. As a result, the master plate unit is in the state shown in FIG. 5, but the roller members 7 do not fall out since the pairs of projections 7b of the roller members 7 are guided by the guide grooves 13.

Since the pairs of projections 7b of the roller members 7 are guided by the guide grooves 13 so that they do not fall out, there is no need for the plurality of plate springs or the like used in the conventional technology to prevent the plurality of ball members from falling out. This allows the number of parts to be reduced and the structure to be simplified. Also, since the roller members 7 serve as the engagement members, line contacts are formed between the roughly cylindrical surface of the roller member 7 and the roller receiver 8 as well as the tapered section 8a. The contact area in this case is larger than that of the ball members used in the conventional technology, and this leads to a lower contact surface pressure, thus significantly improving the durability of the lock mechanism 4 as well as the durability of the tool connecting device 1 for robot hands. Furthermore, since the pairs of projections 7b of the roller members 7 are formed integrally with the main roller units 7a, the number of parts can be further reduced and the structure simplified, thus reducing production costs.

The roller receiver 8 includes an engagement section in the form of a tapered surface 8a tapering radially inward. When the piston member 5 is in the locked position, the plurality of roller members 7 project from the outer surface of the retainer 6 and are supported at the projected position where they are engaged with the tapered surface 8a. When the piston member 5 is in the unlocked position, the plurality of roller members 7 is able to move between the projected position and the recessed position recessed inward from the outer surface of the retainer 6. This structure allows the master plate 2 and the tool plate 3 to be reliably locked and unlocked.

Referring to the figures, the following is a description of alternative embodiments in which partial modifications are made to the tool connecting device 1 for robot hands described above. Elements that are essentially identical to those of the embodiment described above will be assigned the same numerals.

Figure 6:
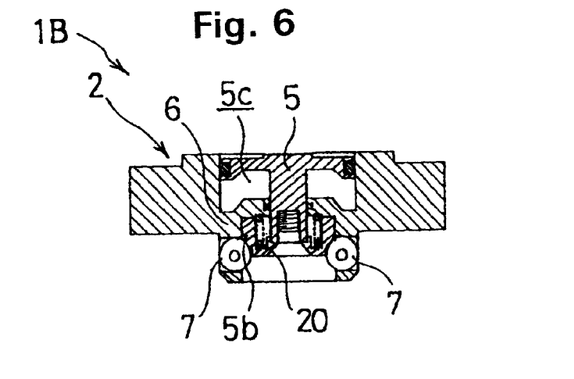
FIG. 6 is a schematic vertical cross-section drawing of an alternative example in which partial changes are made to the tool connection device.

1) Referring to FIG. 6, in a tool connecting device 1B, a spring member 20 is interposed between the output section 5b of the piston member 5 and the retainer 6. The spring member 20 acts to keep the output section 5b of the piston member 5 in the locked position. With this tool connecting device 1B, there is no need to have an air cylinder operating continuously. Also, since a single-acting air cylinder can be used as the air cylinder, production costs can be reduced. Other operations and advantages of this structure are identical to those of the embodiment described above.

Figure 7:
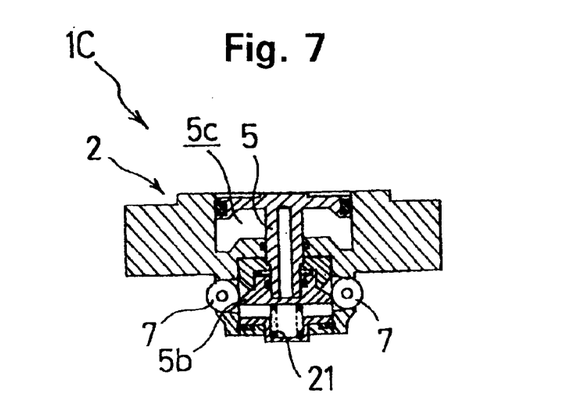
FIG. 7 is a schematic vertical cross-section drawing showing another alternative example in which partial changes are made to the tool connecting device.

2) Referring to FIG. 7, in a tool connecting device 1C, a spring member 21 is interposed between the output section 5b of the piston member 5 and the end of the tool plate 3. The spring member 21 keeps the output section 5b of the piston member 5 at the locked position. This tool connecting device 1C provides roughly similar operations and advantages as those of the tool connecting device 1B described above.

Figure 8:
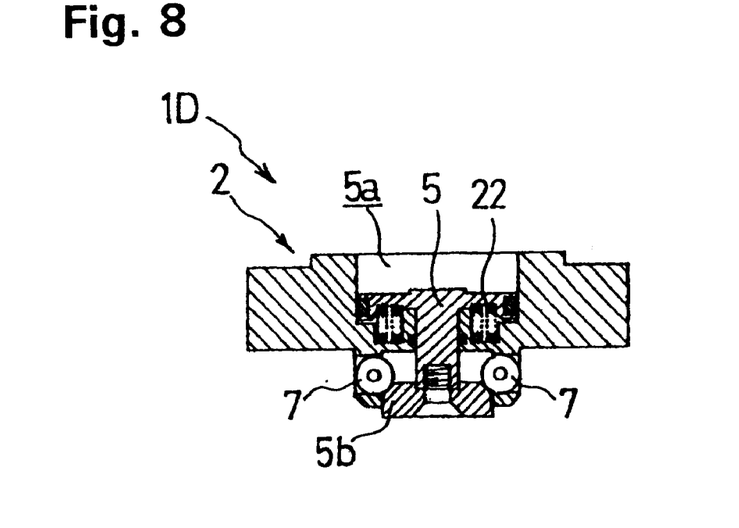
FIG. 8 is a schematic vertical cross-section drawing showing another alternative example in which partial changes are made to the tool connecting device.

3) Referring to FIG. 8, in a tool connecting device 1D, the air cylinder has a first cylinder chamber 5a and a spring member 22 biasing the piston member upward disposed to keep the output section 5b of the piston member 5 in the locked position. This tool connecting device 1D provides roughly similar operations and advantages as those of the tool connecting device 1B described above.

Figure 9:
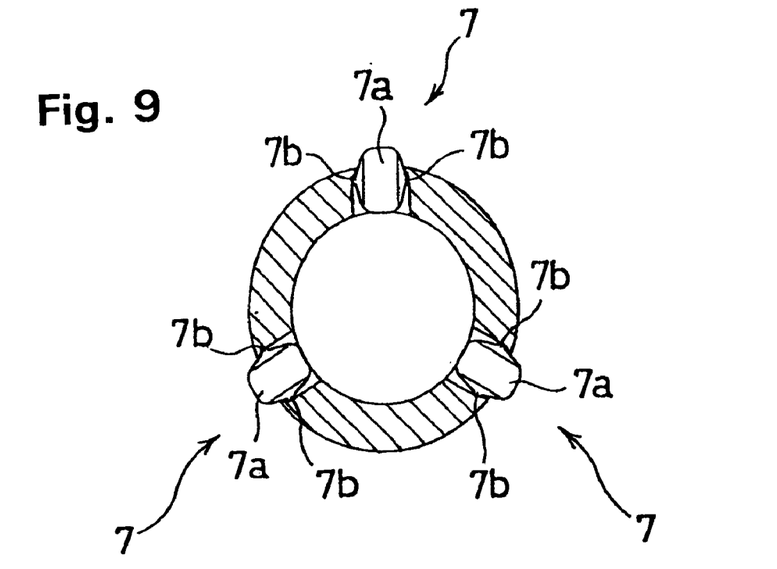
FIG. 9 is a lateral cross-section drawing of a main retainer unit and a roller member based on the tool connecting device described above with changes in the arrangement of the roller member.

4) The pairs of projections 7b of the roller members 7 can take the form of the ends of pin members mounted in openings in the main roller units 7a. This allows easier production of the main roller units 7a. The number of roller members 7 and retainer openings 6a in the retainer 6 is not restricted to four. Referring to FIG. 9, for example, three roller members can be used. The number can also be five or more. Furthermore, the plurality of roller members 7 do not have to be disposed at uniform intervals along the circumference of the retainer 6. It would also be possible to have the roller members 7 be supported in a plurality of retainer openings formed at other appropriate intervals. The retainer 6 can also be fixed integrally with the master plate 2.

Figure 10:
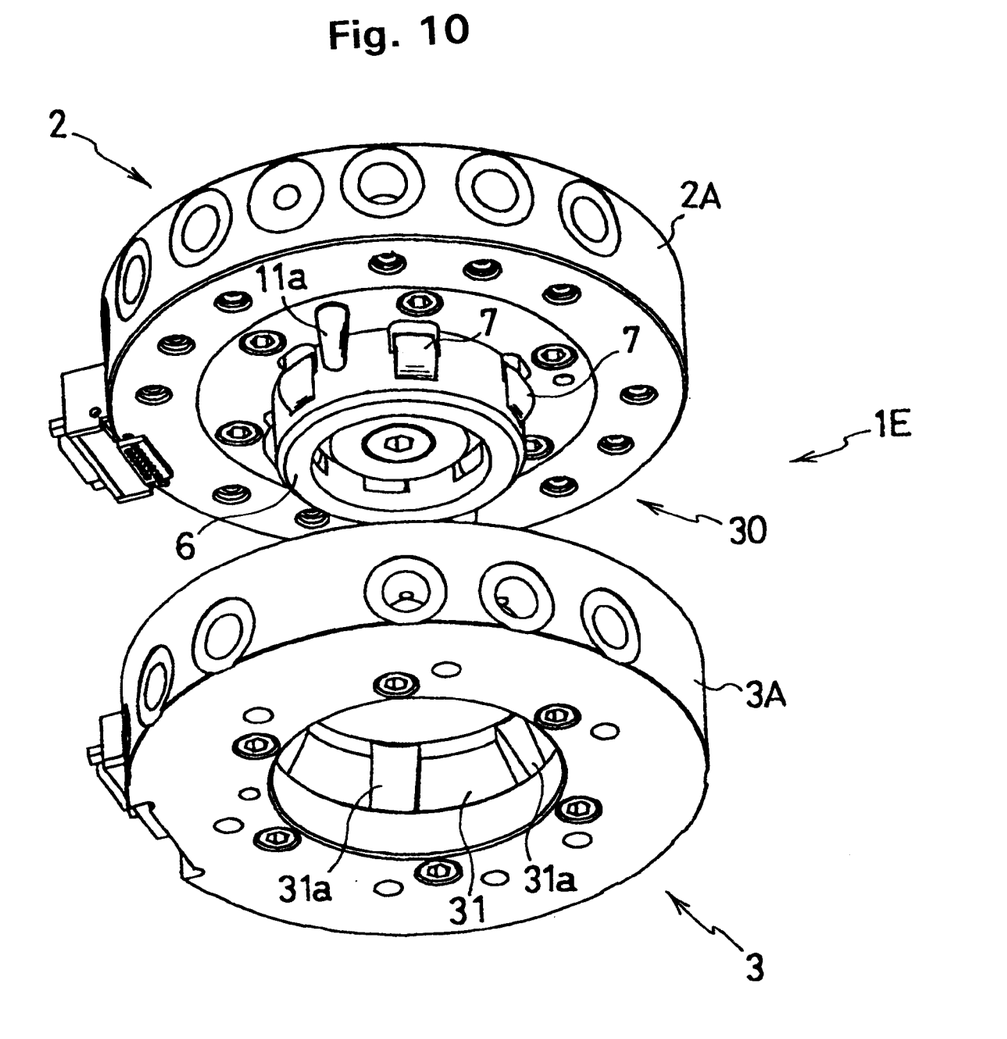
FIG. 10 is a perspective drawing as seen from below of an alternative example of the tool connecting device.
Figure 11:
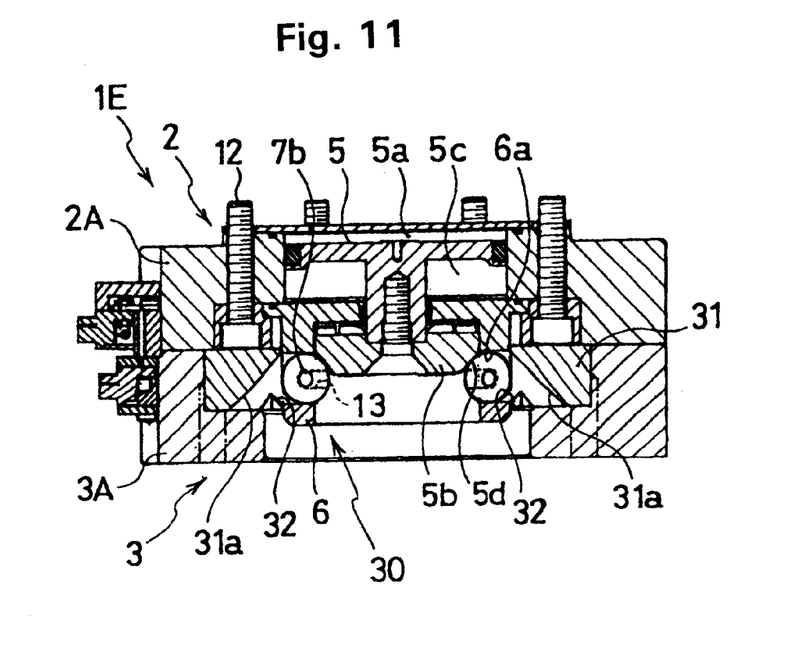
FIG. 11 is a vertical cross-section drawing of the tool connecting device from FIG. 10 (unlocked state).
Figure 12:
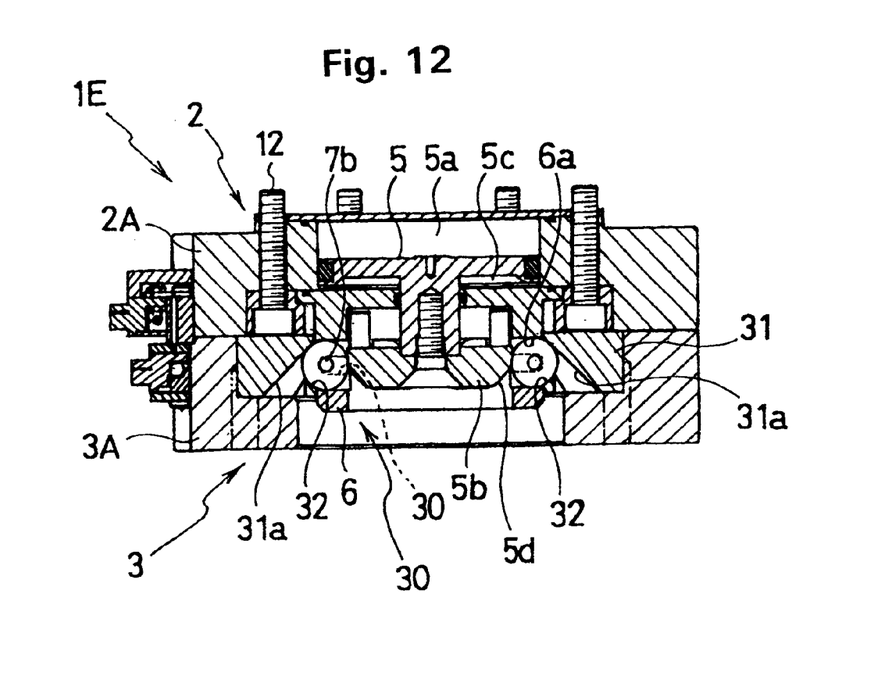
FIG. 12 is a vertical cross-section drawing of the tool connecting device from FIG. 10 (locked state).

5) Referring to FIG. 10 through FIG. 12, A lock mechanism 30 of a tool connecting device 1E includes a roller receiver 31. Tapered surfaces 31a are formed on the roller receiver 31 at positions aligned with the four roller members 7. The tapered surfaces 31a are tapered to slope upward and radially inward. Below the inner ends of the tapered surfaces 31a are disposed contact sections 32 that can form surface contacts with a section of the outer perimeter surface of the roller member 7. The contact section 32 and the tapered surface 31a are formed integrally in the roller receiver 31.

Referring to FIG. 11, when the piston member 5 is in the unlocked position, the master plate 2 and the tool plate 3 can be connected and disconnected. A temporary coupling is formed between the master plate 2 and the tool plate 3. Referring to FIG. 12, the piston member is then lowered to the locked position, and the four roller members 7 are pushed radially outward by the output section 5b so that they come into contact with the tapered surface 31a of the roller receiver 31 and the contact section 32. As a result, the roller members 7 are engaged with the tapered surfaces 8a, the output section 5b, and the retainer openings 6a, thus firmly locking together the master plate 2 and the tool plate 3.

Since a contact section is disposed on the roller receiver 31 of the tool plate 3 to allow surface contact with a section of the outer perimeter surface of the roller member 7, the contact area receiving the roller member 7 is increased, and the contact surface pressure is further reduced. Thus, the life span of the lock mechanism 30 can be significantly improved.

Furthermore, since the plurality of the tapered surfaces 31a is formed on the roller receiver 31 at positions corresponding to the four roller members 6, the plurality of roller surfaces 31a can be formed easily by cutting the away sections of the roller receiver 31, thus reducing production costs. This structure also provides similar operations and advantages as those of the embodiment described above.

6) In place of the tapered surfaces 8a, 31, it would be possible to form contact surfaces on the roller receivers 6, 31 that can form surface contacts with sections of the outer perimeter surfaces of the roller members 7. This allows further increases in the contact area for the roller members 7 and significantly reduces the contact surface pressure, thus providing longer life spans for the lock mechanisms 4, 30.

7) Various other changes to the embodiment described above may also be effected without departing from the spirit of the present invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A tool connecting device for robot hands comprising:
   a master plate connectable to a hand section of a robot hand;
   a tool plate connectable to a tool;
   a piston member movably supported by said master plate and slidable between a locked position and an unlocked position;
   a retainer fixed to said master plate and extending along an outer perimeter of an output section of said piston member;
   a plurality of roller members;
   a plurality of retainer openings formed in said retainer;
   said roller members being supported in said plurality of retainer openings of said retainer and movable in a direction perpendicular to a direction in which said piston member slides;
   a plurality of engagement sections formed on said tool plate;
   said plurality of engagement sections engageable with said plurality of roller members;
   each of said plurality of roller members having a pair of projections disposed at central regions of side surfaces perpendicular to the axis of said roller member; and
   said plurality of retainer openings having guide grooves formed on an inner surface of said retainer openings to prevent said pairs of projections of said plurality of roller members from falling out.

2. A tool connecting device for robot hands according to claim 1 wherein:
   said pairs of projections being formed integrally with said roller members, respectively.

3. A tool connecting device for robot hands according to claim 1 further comprising:
   a plurality of pin members;
   said pairs of projections being formed from said pin members mounted in axial openings of said roller members, respectively.

4. A tool connecting device for robot hands according to claim 1 further comprising:
   an air cylinder disposed on said master plate and for driving said piston member between said locked position and said unlocked position.

5. A tool connecting device for robot hands according to claim 4 wherein said air cylinder is a double-action air cylinder.

6. A tool connecting device for robot hands according to claim 4 wherein said air cylinder is a single-action air cylinder.

7. A tool connecting device for robot hands according to claim 1 wherein:
   when said piston member is in said locked position, said plurality of roller members are supported at a projected position projecting from an outer surface of said retainer and engaged with said engagement sections; and
   when said piston member is in said unlocked position, said plurality of roller members are movable between said projected position and a recessed position recessed inward from said outer surface of said retainer.

8. A tool connecting device for robot hands according to claim 7 wherein said engagement sections include a tapered section tapered radially inward toward said master plate.

9. A tool connecting device for robot hands according to claim 7 wherein said piston member includes a restricting section restricting said roller members from moving inward from said recessed position when said piston member is in said unlocked position.

10. A tool connecting device for robot hands according to claim 1 wherein said plurality of retainer openings are formed at appropriate intervals along a perimeter of said retainer.

11. A tool connecting device for robot hands according to claim 1 wherein said plurality of engagement sections are formed at positions of said tool plate corresponding to said plurality of roller members.

12. A tool connecting device for robot hands according to claim 1 wherein said guide grooves are formed as U-shaped grooves opening inward.

* * * * *

UNITED STATES PATENT AND TRADEMARK OFFICE
CERTIFICATE OF CORRECTION

PATENT NO. : 6,375,378 B1 Page 1 of 1
DATED : April 23, 2002
INVENTOR(S) : Ichiro Kitaura It is certified that error appears in the above-identified patent and that said Letters Patent is hereby corrected as shown below:

<u>Title page,</u>
Item [22], Filed: delete "[22] Filed: Jul. 5, 2000 " and replace with
-- [22] PCT Filed: Jan. 18, 1999 --.

Add -- [86] PCT No.: PCT/JP99/00144 --
-- §371 Date: Jul. 5, 2000 --
-- §102(e) Date: Jul. 5, 2000 --

Add -- [87] PCT Pub. No. WO00/27596 --
-- PCT Pub. Date: May 18, 2000 --

Signed and Sealed this

Twenty-ninth Day of October, 2002

Attest:

*Attesting Officer*

JAMES E. ROGAN
*Director of the United States Patent and Trademark Office*